United States Patent
Yang et al.

(10) Patent No.: US 7,558,353 B2
(45) Date of Patent: Jul. 7, 2009

(54) METHOD FOR SUPPRESSING IMPULSE NOISE AND DEVICE THEREOF

(75) Inventors: Yu-Ching Yang, Sinjhuang (TW); Jia-Shian Jiang, Taipei (TW)

(73) Assignee: Sunplus Technology Co., Ltd., Hsinchu (TW)

(*) Notice: Subject to any disclaimer, the term of this patent is extended or adjusted under 35 U.S.C. 154(b) by 576 days.

(21) Appl. No.: 11/369,621

(22) Filed: Mar. 6, 2006

(65) Prior Publication Data
US 2007/0121760 A1    May 31, 2007

(30) Foreign Application Priority Data
Nov. 25, 2005   (TW) .............................. 94141427 A

(51) Int. Cl.
H04B 1/10     (2006.01)
(52) U.S. Cl. ..................................................... 375/350
(58) Field of Classification Search ................. 375/222, 375/260, 285, 346, 350
See application file for complete search history.

(56) References Cited

U.S. PATENT DOCUMENTS 5,809,085 A * 9/1998 Goodson et al. ............ 375/320
6,385,261 B1 * 5/2002 Tsuji et al. .................. 375/346
2003/0210749 A1 * 11/2003 Asjadi ......................... 375/260
2004/0247060 A1 * 12/2004 Shibuya et al. .............. 375/346
2006/0062322 A1 * 3/2006 Namgoong et al. .......... 375/285

FOREIGN PATENT DOCUMENTS

| EP | 1 043 874 | 10/2000 |
| EP | 1 180 851 | 2/2002 |
| EP | 1 309 095 | 5/2003 |

* cited by examiner

*Primary Examiner*—Khanh C Tran
(74) *Attorney, Agent, or Firm*—J.C. Patents

(57) ABSTRACT

A method for suppressing impulse noises is provided. The method is employed to receive a sample stream x[n], and to detect and suppress the interruption of impulse noise to the samples, wherein the sample stream x[n] includes a plurality of samples and n represents a discrete-time independent variable. The method includes comparing the energy sum of a $(k-1)^{th}$ sample and a $k^{th}$ sample multiplied by a first constant with a first threshold, comparing energy sum of the $k^{th}$ sample and a $(k+1)^{th}$ sample multiplied by a second constant with a second threshold while the energy sum of the $(k-1)^{th}$ sample and the $k^{th}$ sample multiplied by the first constant is greater than the first threshold, and replacing the $k^{th}$ sample with a first replacement sample to output while the energy sum of the $k^{th}$ sample and the $(k+1)^{th}$ sample multiplied by the second constant is greater than the second threshold.

23 Claims, 7 Drawing Sheets

METHOD FOR SUPPRESSING IMPULSE NOISE AND DEVICE THEREOF

CROSS-REFERENCE TO RELATED APPLICATION

This application claims the priority benefit of Taiwan application serial no. 94141427, filed on Nov. 25, 2005. All disclosure of the Taiwan application is incorporated herein by reference.

BACKGROUND OF THE INVENTION

1. Field of Invention

The present invention relates to a method for suppressing impulse noise. More particularly, the present invention relates to a method for comparing the energy sums of a plurality of samples in a sample stream with thresholds to detect and suppress impulse noise and the device thereof, and the method is applicable to various digital communication receivers.

2. Description of Related Art

Impulse noise is composed of one or multiple pulses having large oscillation amplitude (or energy) and short period. Impulse noises may occur in, for example, electrical wire spool apparatus, central heater thermostat, lightning switch, or ignition system. These impulse noises may interrupt the decision-making regarding transmission symbols of the communication system and may reduce the performance of the entire communication system. For example, in digital terrestrial TV system, Coded Orthogonal Frequency Division Multiplexing (COFDM) is adopted in the European Digital Video Broadcasting-Terrestrial (DVB-T) standard as the transmission modulation technology of digital bit stream and which is prone to interruption of impulse noises.

Accordingly, suppressing impulse noise at the receiver portion has become an important method for improving system performance. In European Patent No. 1,043,874, the clipping level of an analog-to-digital converter (ADC) is used as the threshold. When the data level of a signal converted by the ADC is higher than the positive clipping level or is lower than the negative clipping level, it is determined that the data has been interrupted by impulse noise and is to be replaced with a digital value to be output. Here, the digital value may be 0 or the long-term average of the signal.

In European Patent No. 1,180,851, the threshold is generated dynamically by a threshold generator according to a digital stream and is provided to a comparator. The comparator compares the threshold and a digital data to determine whether the digital data is interrupted by impulse noise and is to be replaced with a digital value. Here, the digital value may be 0 or the moving average of the signal.

Moreover, in European Patent No. 1,309,095, several consecutive digital data in the signal are compared with the threshold by a delay chain, and it is determined that whether these digital data are interrupted by impulse noises and are to be replaced with digital values according to the comparison results. For example, when the values of more than 4 digital data in eight digital data are greater than the threshold, which means the signal has started to be interrupted by impulse noise, then it is started to replace the digital data with a digital value to output until at the same time the value of at most one digital data in the eight digital data is smaller than the threshold.

SUMMARY OF THE INVENTION

Accordingly, the present invention is directed a method for suppressing impulse noise for sequentially receiving samples, detecting the occurrence points of impulse noises and suppressing interruptions to the samples.

According to another aspect of the present invention, a device for suppressing impulse noise is provided for sequentially receiving samples sequentially, detecting occurrence points of impulse noises and suppressing interruptions to the samples.

In accordance with the above objectives and other objectives of the present invention, a method for suppressing impulse noise for sequentially receiving a sample stream $x[n]$, detecting and suppressing interruptions of impulse noises to the sample stream $x[n]$, wherein the sample stream $x[n]$ includes a plurality of samples and n represents a discrete-time independent variable. The method for suppressing impulse noise includes comparing the energy sum of a $(k-1)^{th}$ sample and a $k^{th}$ sample multiplied by a first constant with a first threshold, comparing the energy sum of the $k^{th}$ sample and a $(k+1)^{th}$ sample multiplied by a second constant with a second threshold while the energy sum of the $(k-1)^{th}$ sample and the $k^{th}$ sample multiplied by the first constant is greater than the first threshold, and replacing the $k^{th}$ sample with a first replacement sample to output while the energy sum of the $k^{th}$ sample and the $(k+1)^{th}$ sample multiplied by the second constant is greater than the second threshold. Wherein k is a positive integer and the first threshold may be equal to the second threshold.

The method for suppressing impulse noise according to an exemplary embodiment of the present invention further includes respectively comparing the energies of the $(k+1)^{th}$ to the $(k+m)^{th}$ samples with a third threshold while the energy sum of the $(k-1)^{th}$ sample and the $k^{th}$ sample multiplied by the first constant is greater than the first threshold and the energy sum of the $k^{th}$ sample and the $(k+1)^{th}$ sample multiplied by the second constant is greater than the second threshold, and replacing the $(k+1)^{th}$ sample with a second replacement sample to output while at least one of the energies of the $(k+1)^{th}$ to the $(k+m)^{th}$ samples is greater than the third threshold. Wherein m is a positive integer and is greater than 1.

The present invention further provides a device for suppressing impulse noise for sequentially receiving a sample stream. $x[n]$ and detecting and suppressing interruptions of impulse noises to the sample stream $x[n]$, wherein the sample stream $x[n]$ includes a plurality of samples obtained by sampling the signals according to a sampling period, and n represents a discrete-time independent variable. The device for suppressing impulse noise includes a first delay, a second delay and a third delay; a first energy obtainer, an adder, a comparator, a first AND gate, and a first selector. In an embodiment of the present invention, the first selector may be a multiplexer.

Wherein, the first delay receives the samples of the sample stream $x[n]$ in sequence and outputs each sample after delaying a sampling period. The first energy obtainer receives the samples of the sample stream $x[n]$ in sequence and outputs the energy of each sample. The second delay receives the output of the first energy obtainer and outputs the output of the first energy obtainer after delaying a sampling period. The adder receives the outputs of the first energy obtainer and the second delay to output the energy sum of the outputs of the first energy obtainer and the second delay. The comparator compares the energy sum of the outputs of the first energy obtainer and the second delay with a first threshold or a second threshold, and outputs a first comparison result. The third delay receives the first comparison result and delays the first comparison result a sampling period to output a second comparison result. The first AND gate receives the first comparison result and the second comparison result and performs logic AND operation to output a first control signal. The first selector selects one of the output of the first delay and a first replacement sample according to the first control signal to output as a first output signal.

The device for suppressing impulse noise according to an exemplary embodiment of the present invention further includes a first delay set and a second delay set; a second energy obtainer, a comparator set, an OR gate, a second AND gate and a second selector. In an embodiment, the second selector may be a multiplexer.

Wherein, the first delay set receives a sample stream x[n−1] which is a delayed version of the sample stream x[n] shifted by one sampling period, and outputs the samples of the sample stream x[n−1] after delaying m−1 sampling periods. The second energy obtainer receives the samples of the sample stream x[n−1] and outputs the energies of the samples. The second delay set receives the output of the second energy obtainer and delays the output of the second energy obtainer to output the energies of m−1 delayed samples, wherein the energy of the $1^{st}$ delayed sample is the output of the second energy obtainer after delaying one sampling period, the energy of the $i^{th}$ delayed sample is the energy of the $(i-1)^{th}$ delayed sample after delaying one sampling period, and i is an integer and $1 < i \leq m$. The comparator receives the output of the second energy obtainer, the energies of the delayed samples, and a third threshold, and compares the output of the second energy obtainer and the energy of each delayed sample with the third threshold to output the comparison results. The OR gate receives the comparison results and performs logic OR operation to output a third control signal. The second AND gate receives the first control signal and the third control signal and performs logic AND operation to output a second control signal. The second selector selects one of the output of the first delay set and a second replacement sample according to the second control signal to output as a second output signal.

In the present invention, the energies of a plurality of samples are compared with the thresholds to determine whether the samples are interrupted by impulse noises and to suppress the samples interrupted by the impulse noises, and the structure thereof is easy to implement. Moreover, besides one-phase detection and suppression, the method and device in the present invention can also employ two-phase detection and suppression to obtain lower bit error rate (BER).

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
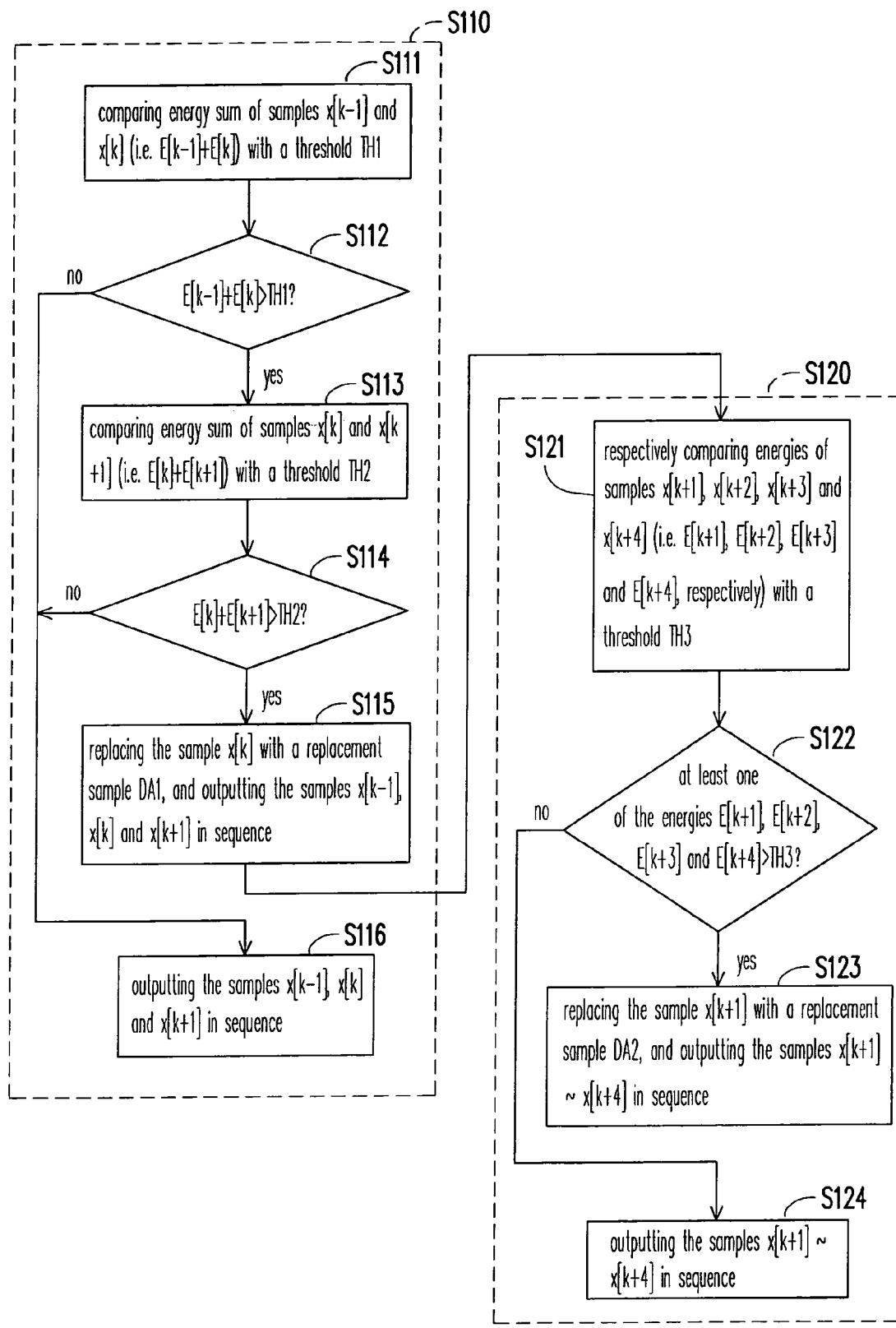
FIG. 1 is a flowchart illustrating the method for suppressing impulse noise according to an exemplary embodiment of the present invention.
Figure 2A:
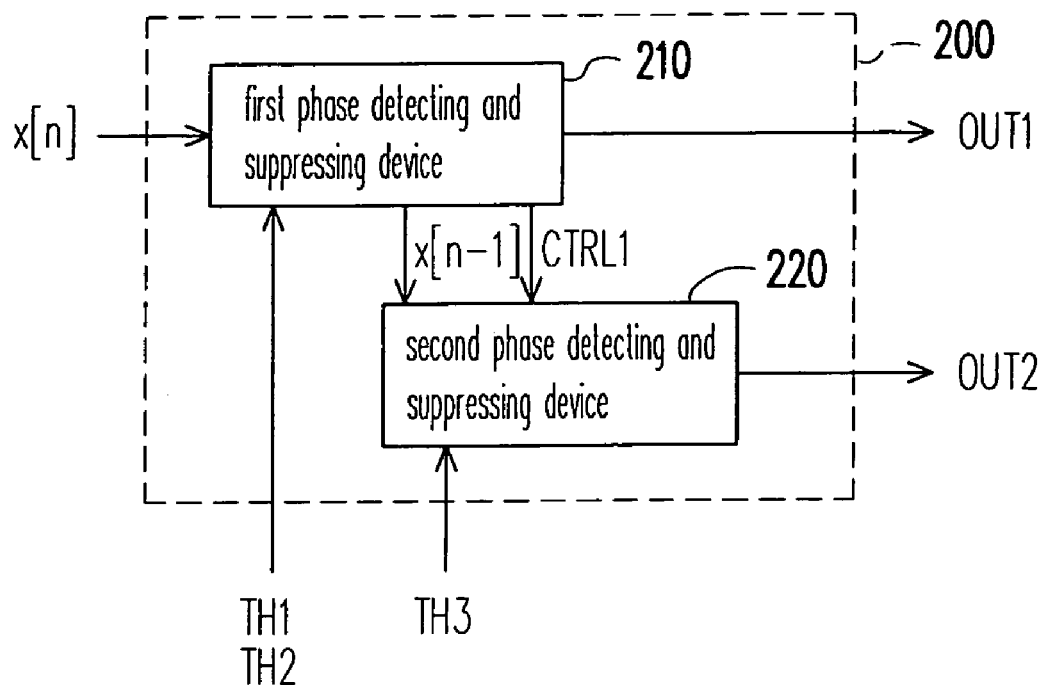
FIG. 2A is a block diagram of a device for suppressing impulse noise according to an exemplary embodiment of the present invention.

FIG. 1 is a flowchart illustrating the method for suppressing impulse noise according to an exemplary embodiment of the present invention. Referring to FIG. 1, the method for suppressing impulse noise includes two phases, i.e. the first phase S110 and the second phase S120. FIG. 2A is a block diagram of a device 200 for suppressing impulse noise according to the method illustrated in FIG. 1. Device 200 includes a first phase detecting and suppressing device 210 corresponding to the first phase S110, a second phase detecting and suppressing device 220 corresponding to the second phase S120, and other input/output or control signals. In addition, FIG. 2B is a diagram illustrating the first phase S110 (or the first phase detecting and suppressing device 210 in FIG. 2A) and the second phase S120 (or the second phase detecting and suppressing device 220 in FIG. 2A) in FIG. 1 respectively operating on the sample stream.

In various digital system (e.g. DVB-T system with COFDM) receivers, the received analog signals are sampled according to a sampling periods to generate a sample stream x[n]. The sample stream x[n] includes a plurality of samples, wherein the $1^{st}$ sample is denoted as x[1], the $2^{nd}$ sample is denoted as x[2], . . . , the $k^{th}$ sample is denoted as x[k], and k is a positive integer. In addition, the energy of the sample x[1] is denoted as E[1], the energy of the sample x[2] is denoted as E[2], . . . , the energy of the sample x[k] is denoted as E[k].

Figure 2B:
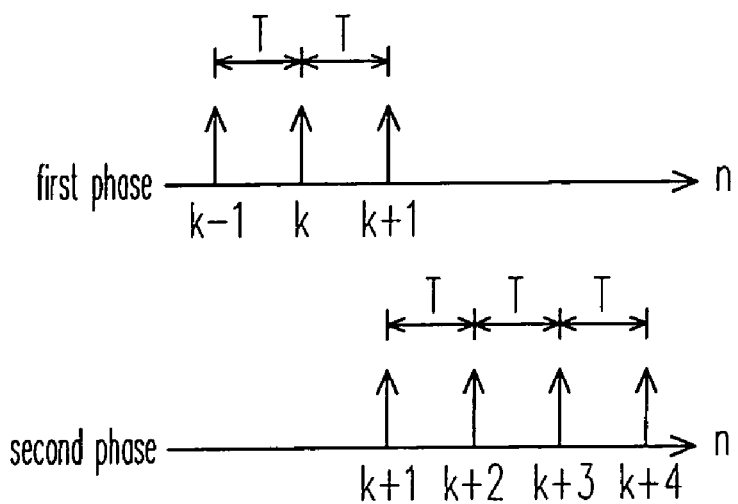
FIG. 2B is a diagram illustrating the respective operations on the sample stream of a first phase and a second phase detecting and suppressing devices in FIG. 2A.
Figure 2C:
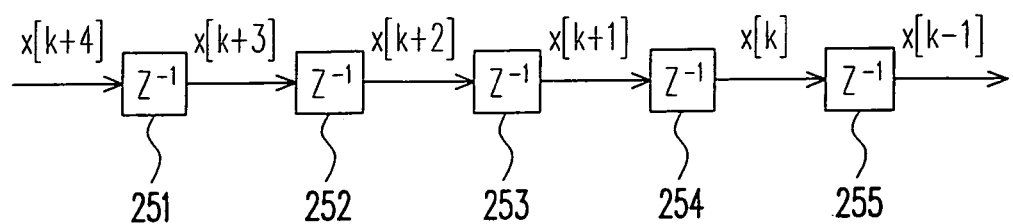
FIG. 2C is a diagram illustrating samples x[k+4]~x[k−1]

Moreover, as shown in FIG. 2C, sample x[k+3] is sample x[k+4] after delaying a sampling period T, sample x[k+2] is sample x[k+3] after delaying a sampling period T, . . . , sample x[k−1] is sample x[k] after delaying a sampling period T, wherein the delays 251~255 all have the delay time with the duration of a sampling period T. Similarly, energy E[k+3] is energy E[k+4] after delaying a sampling period T, energy E[k+2] is energy E[k+3] after delaying a sampling period T, . . . , energy E[k−1] is energy E[k] after delaying a sampling period T.

Referring to both FIG. 1 and FIG. 2B, according to the method for suppressing impulse noise, three consecutive samples (i.e. x[k−1], x[k], and x[k+1]) are processed in the first phase S110. In step S111, the energy E[k−1] of the sample x[k−1] is added to the energy E[k] of the sample x[k], while since the weights of the energies of the samples x[k−1]

and x[k] may not be the same, the sum of the two energies is expressed as E[k−1]+C1×E[k], wherein the first constant C1 represents the weight ratio between the energies of the samples x[k] and x[k−1]. However, for the convenience of description, below the first constant is assigned value 1, accordingly, next, the energy sum E[k−1]+E[k] of the samples x[k−1] and x[k] is compared with the first threshold TH1.

In step S112, it is determined that whether the energy sum E[k−1]+E[k] is greater than the threshold TH1. Step S113 is proceeded when the energy sum E[k−1]+E[k] is greater than the threshold TH1. In step S113, the energy sum E[k]+C2×E[k+1] of the samples x[k] and x[k+1] is compared with the second threshold TH2, wherein the second constant C2 represents the weight ratio between the energies of the samples x[k+1] and x[k]. However, for the convenience of description, below the second constant is assigned value 1, thus, whether the energy sum E[k]+E[k+1] is greater than the threshold TH2 is determined in step S114. In an embodiment, the threshold TH1 may be equal to the threshold TH2.

In step S114, the energy sum of the sample x[k] with its previous sample x[k−1], and the energy sum of the sample x[k] with its next sample x[k+1] both exceed the threshold if the energy sum E[k]+E[k+1] is greater than the threshold TH2. Here, the possibility of the sample x[k] being interrupted by impulse noise is very high, thus step S115 is executed to suppress the impulse noise and to replace the likely interrupted sample x[k] with a first replacement sample DA1.

Thus, after the samples x[k−1], x[k], and x[k+1] are processed in the first phase S110, sample x[k−1], replacement sample DA1, and sample x[k+1] are output in sequence. Here, the replacement sample DA1 may be the long-term average or the moving average of the signal, or may also be a digital value.

As to the situations of the energy sum E[k−1]+E[k] being smaller than the threshold TH1 in step S112, or the energy sum E[k−1]+E[k] being greater than the threshold TH1 in step S112 but the energy sum E[k]+E[k+1] being smaller than the threshold TH2 in step S114, the sample x[k] is determined being not interrupted by impulse noise, so the sample x[k] is not replaced. In other words, the original samples x[k−1], x[k], and x[k+1] are output in sequence after they are processed in the first phase If in the first phase S110, the sample x[k] is determined being interrupted by impulse noise, the following several samples (i.e. x[k+1], x[k+2], . . . , x[k+m], wherein m is a positive integer and is greater than 1) have high possibility of being interrupted by impulse noises. Thus, according to the method for suppressing impulse noise, the samples x[k+1]~x[k+m] are processed during the second phase S120. In the present embodiment, m=4.

In step S121, the energy E[k+1] of sample x[k+1], the energy E[k+2] of sample x[k+2], the energy E[k+3] of sample x[k+3], and the energy E[k+4] of sample x[k+4] are respectively compared with the third threshold TH3. In step S122, it is determined that whether the energy of at least one sample among the samples x[k+1]~x[k+4] is greater than the threshold TH3. When there is at least one sample having its energy greater than threshold TH3, the possibility of sample x[k+1] being interrupted by impulse noise is very high. Here, step S123 is executed to suppress the impulse noise and to replace the likely interrupted sample x[k+1] with a second replacement sample DA2. Accordingly, the replacement sample DA2 and samples x[k+2]~x[k+4] are output sequentially after the samples x[k+1]~x[k+4] are processed during the second phase S120. In an embodiment of the present invention, the replacement sample DA2 may be equal to the replacement sample DA1.

Figure 2D:
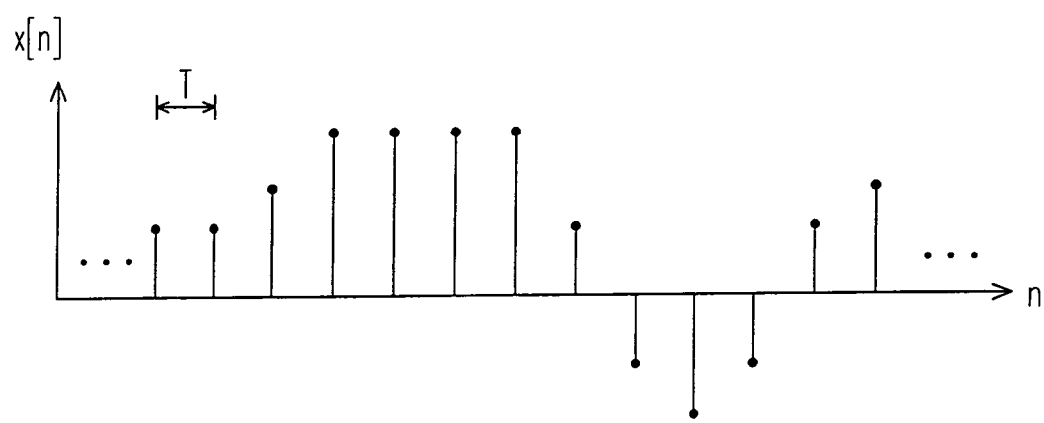
FIG. 2D is a diagram illustrating sample streams x[n] and x[n−1]
Figure 2D:
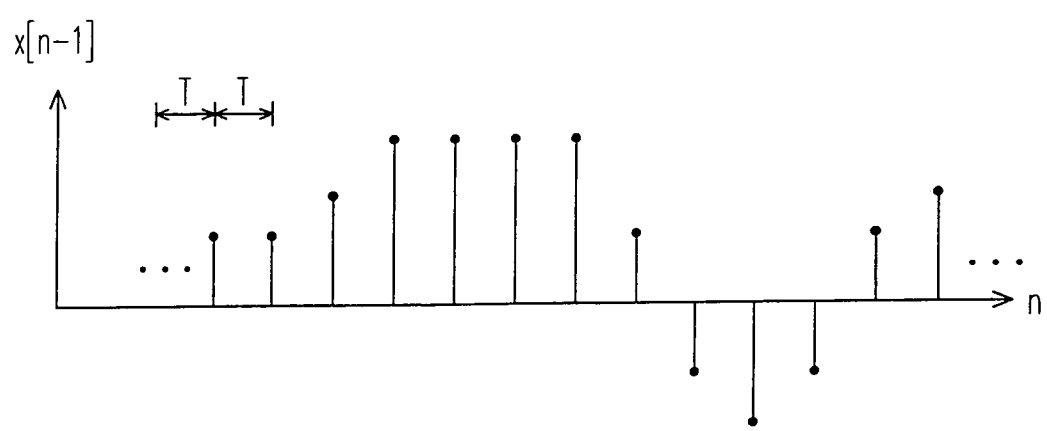

Referring to FIG. 2A, the device 200 for suppressing impulse noise includes a first phase detecting and suppressing device 210 and a second phase detecting and suppressing device 220. The first phase detecting and suppressing device 210 receives a sample stream x[n], a first threshold TH1, and a second threshold TH2, and outputs a first output signal OUT1 and a first control signal CTRL1. The second phase detecting and suppressing device 220 receives a sample stream x[n−1], a first control signal CTRL1, and a third threshold TH3, and outputs a second output signal OUT2. Wherein, the diagrams of the sample streams x[n] and x[n−1] are illustrated in FIG. 2D, and the sample stream x[n] is an advanced version of the sample stream x[n−1] shifted by one sampling period T. The detailed circuit block diagrams of the detecting and suppressing devices 210 and 220 are respectively illustrated in FIGS. 3A and 3B.

Figure 3A:
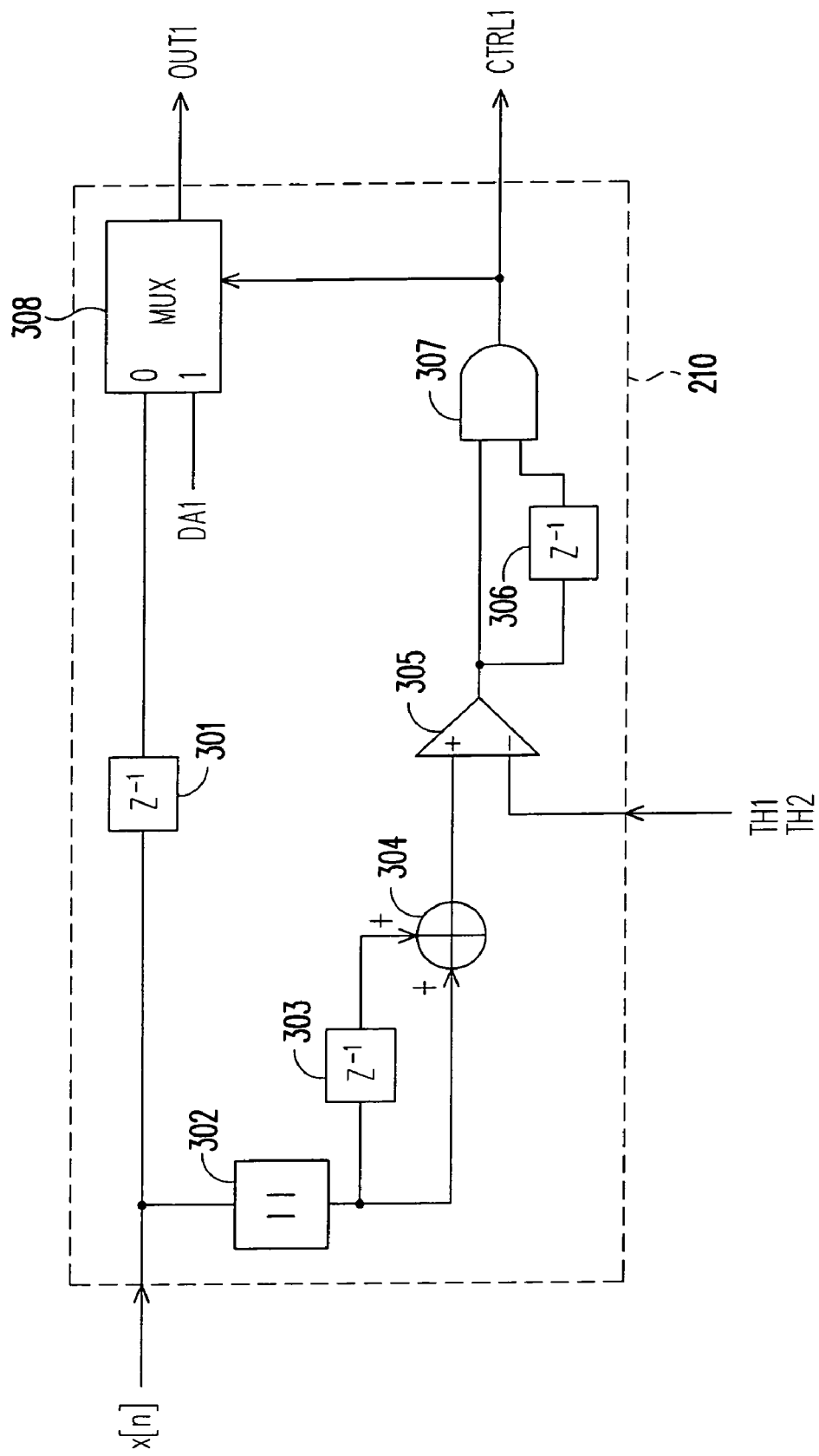
FIGS. 3A and 3B are block diagrams respectively illustrating the first phase detecting and suppressing device and the second phase detecting and suppressing device in FIG. 2A.

Referring to FIG. 3A, the first phase detecting and suppressing device 210 includes a first delay 301, a second delay 303, a third delay 306, a first energy obtainer 302, an adder 304, a comparator 305, a first AND gate 307 and a first selector 308. In an embodiment of the present invention, the first selector 308 may be a multiplexer.

For example, the detecting and suppressing device 210 receives the sample x[k] of the sample stream x[n]. The delay 301 receives the sample x[k] and delays a sampling period T to output the sample x[k−1]. The energy obtainer 302 receives the sample x[k] and outputs the energy E[k] of the sample x[k]. The delay 303 receives the energy E[k] of the sample x[k] and delays a sampling period T to output energy E[k−1], i.e. the energy of the sample x[k−1]. The adder 304 receives the energies of the samples x[k] and x[k−1], which are respectively E[k] and E[k−1], and outputs the sum E[k−1]+E[k] of the two energies. The comparator 305 compares the energy sum E[k−1]+E[k] with the threshold TH1 and outputs a first comparison result COMP1. The delay 306 receives the first comparison result COMP1 and delays a sampling period T to output a second comparison result COMP2, i.e. the result of comparing the energy sum E[k]+E[k+1] and the threshold TH2. Based on the foregoing analysis, the result of comparing the energy sum E[k]+E[k+1] and the threshold TH2 is generated while the detecting and suppressing device 210 receives the sample x[k+1] of the sample stream x[n], here the output of the delay 301 is the sample x[k].

When the energy sum E[k−1]+E[k] of the samples x[k−1] and x[k] is greater than the threshold TH1, i.e. the comparison result COMP1 is "1", and when the energy sum E[k]+E[k+1] of the samples x[k] and x[k+1] is also greater than the threshold TH2, i.e. the comparison result COMP2 is also "1", the control signal CTRL1 output by the AND gate 307 is "1", which means the sample x[k] is interrupted by impulse noise. Here, the control signal CTRL1 is "1" and controls the selector 308 to select the replacement sample DA1 to output as the output signal OUT1. As to the situations of the energy sum E[k−1]+E[k] being smaller than the threshold TH1, or the energy sum E[k−1]+E[k] being greater than the threshold TH1 but the energy sum E[k]+E[k+1] being smaller than the threshold TH2, the sample x[k] is not interrupted by impulsive noise. Here, the control signal CTRL1 is "0" and controls the selector 308 to select the sample x[k] output by the delay 301 to output as the output signal OUT1.

Figure 3B:
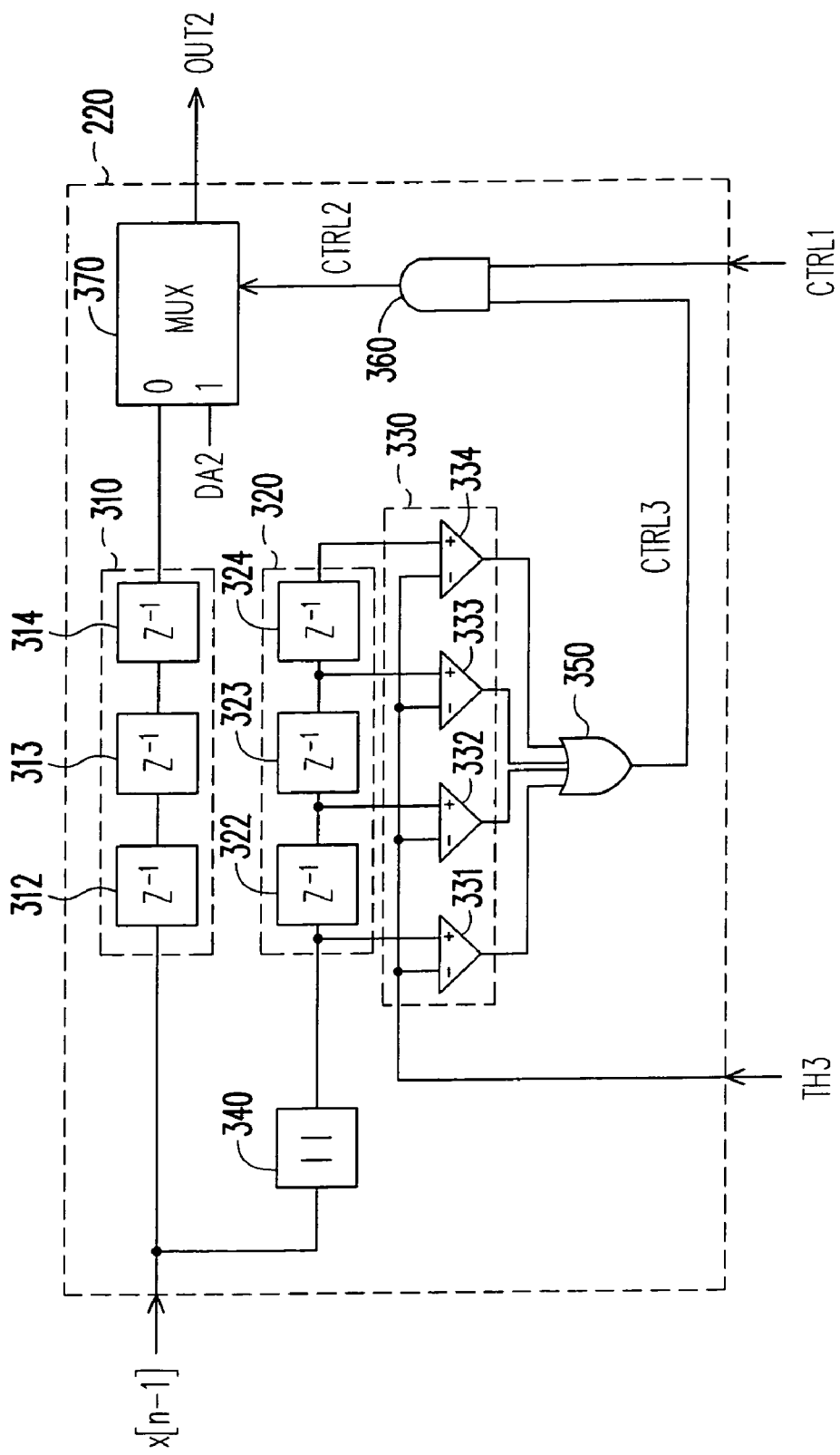

Referring to FIG. 3B, the second phase detecting and suppressing device 220 includes a first delay set 310, a second delay set 320, a second energy obtainer 340, a comparator set 330, an OR gate 350, a second AND gate 360, and a second selector 370. In an embodiment of the present invention, the second selector 370 may be a multiplexer. Wherein, the delay sets 310 and 320 can both delay the inputs thereof m−1 sampling period T, i.e. the delay sets 310 and 320 both can be formed by coupling m−1 delays, which can delay one sampling period T, in series. The comparator set 330 includes m comparators. In the present embodiment, m=4. Accordingly, the delay set 310 includes delays 312~314, the delay set 320 includes delays 322~324, and the comparator set 330 includes comparators 331~324.

For example, the detecting and suppressing device 220 receives the sample x[k+4] of the sample stream x[n−1]. The delay set 310 receives the sample x[k 4] and delays three sampling period T to output a sample x[k+1]. The energy obtainer 340 receives the sample x[k+4] and outputs the energy E[k+4] of the sample x[k+4]. The delay set 320 receives the energy E[k+4] of the sample x[k+4] and delays it to output the energies of three delayed samples, wherein the energy E[k+3] of the $1^{st}$ delayed sample x[k+3] output by the delay 322 is the output E[k+4] of the energy obtainer 340 after delaying a sampling period T, the energy E[k+2] of the $2^{nd}$ delayed sample x[k+2] output by the delay 323 is the energy E[k+3] of the first delayed sample x[k+3] after delaying a sampling period T, and the energy E[k+1] of the $3^{rd}$ delayed sample x[k+1] output by the delay 324 is the energy E[k+2] of the $2^{nd}$ delayed sample x[k+2] after delaying a sampling period T.

The output E[k+4] of the energy obtainer 340 and the energies E[k+3]~E[k+1] of the delayed samples are respectively received by the corresponding comparators 331~334 in the comparator set 330 to be respectively compared with the threshold TH3 and to output the comparison results. The OR gate 350 receives these comparison results and performs logic OR operation to output the third control signal CTRL3. When at least one of the energies E[k+4]~E[k+1] is greater than the threshold TH3, e.g. the energy E[k+3] is greater than the threshold TH3, the comparison result output by the comparator 331 is, e.g. "1", so that the control signal CTRL3 output by the OR gate 350 is "1". Here, if the control signal CTRL1 is also "1" (i.e. the sample x[k] is interrupted by impulse noise), then the AND gate 360 outputs a second control signal CTRL2 according to the control signals CTRL1 and CTRL3 to control the selector 370 to select the replacement sample DA2 to output as the second output signal OUT2.

When the energies E[k+4]~E[k+1] are all smaller than the threshold TH3, which means the possibility of the sample x[k+1] being interrupted by impulse noise is very low, the comparison results output by the comparators 331~334 are, e.g. all "0", so that the control signal CTRL3 output by the OR gate 350 is "0". Thus, no matter what the control signal CTRL1 is, the control signal CTRL2 output by the AND gate 360 are all "0", and which controls the selector 370 to select the sample x[k+1] output by the comparator set 310 to output as the output signal OUT2.

Actually, the method for suppressing impulse noise as shown in FIG. 1 can be achieved with only the first phase S110, however, with the second phase S120 integrated, better performance, e.g. bit error rate about 1 dB lower, can be achieved. Similarly, in FIG. 2A, the device 200 for suppressing impulse noise employing the method in FIG. 1 can also be achieved with only a first phase detecting and suppressing device 210, however, if integrated with the second phase detecting and suppressing device 220, better performance can be achieved. Moreover, the method and device of the present invention are applicable to an intermediate frequency system, wherein the sample stream x[n] is a plurality of signals, but are also applicable to a baseband system, wherein the sample stream x[n] is real number signals. Furthermore, the method and device of the present invention are applicable to an orthogonal frequency division multiplexing (OFDM) system or a coded orthogonal frequency division multiplexing (COFDM) system.

Figure 4:
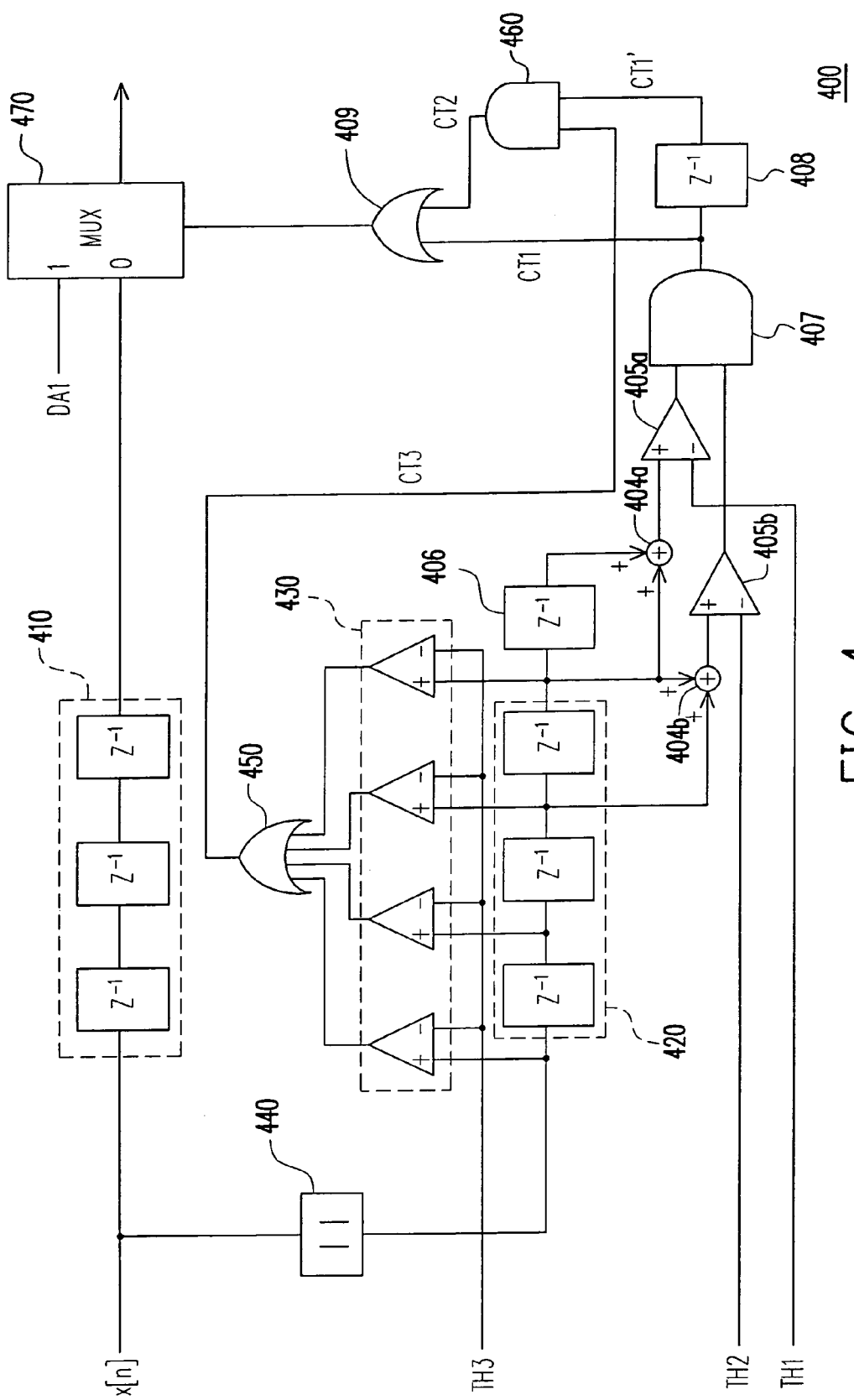
FIG. 4 is a block diagram of a device for suppressing impulse noise according to another exemplary embodiment of the present invention.
Figure 5:
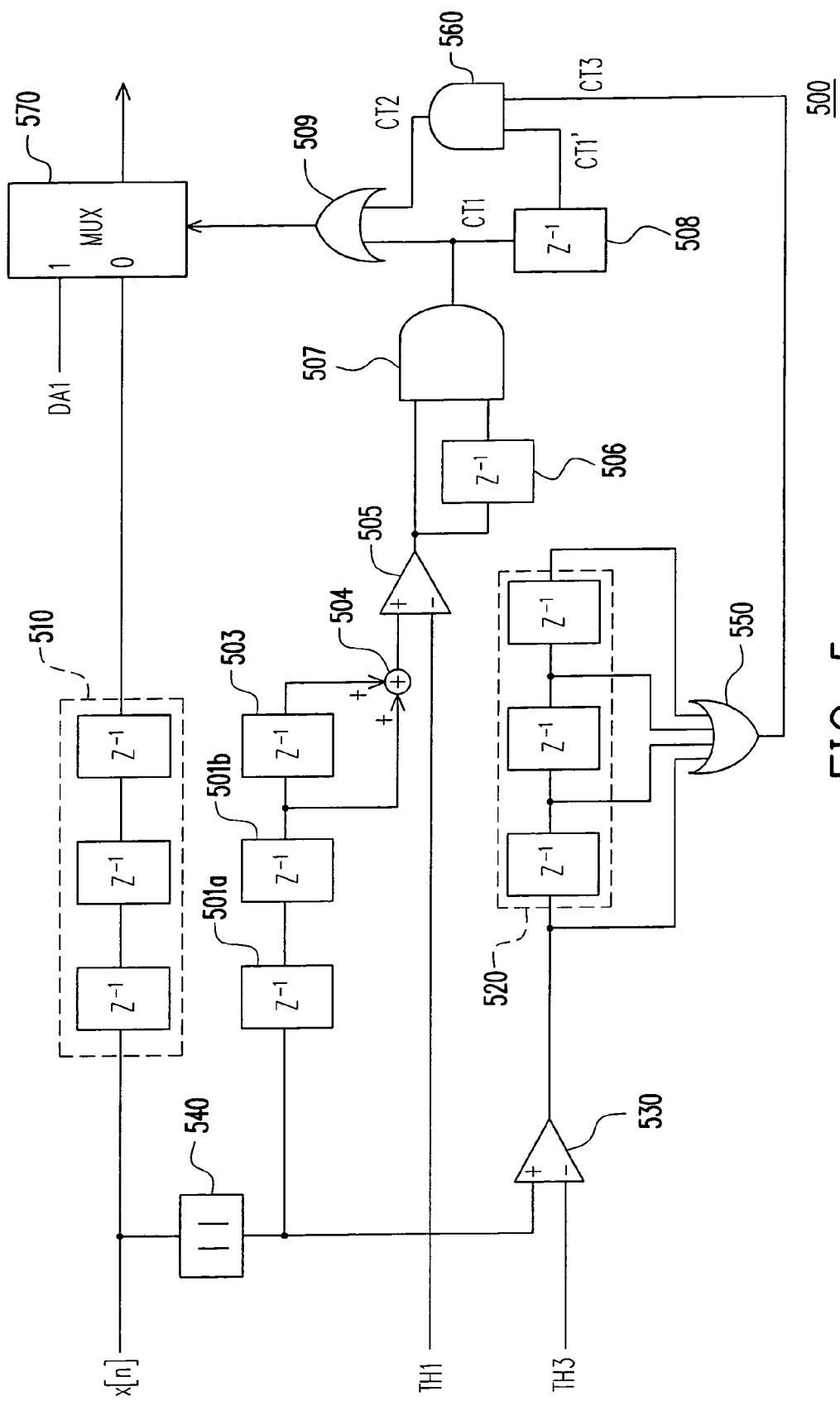
FIG. 5 is a block diagram of a device for suppressing impulse noise according to yet another exemplary embodiment of the present invention.

When the device for suppressing impulse noise of the present invention includes a first phase and a second phase detecting and suppressing devices, the circuit thereof can be altered appropriately to simplify the structure, e.g. the devices for suppressing impulse noise as shown in FIGS. 4 and 5.

Referring to FIG. 4, the precondition of implementing the device 400 for suppressing impulse noise is that the first replacement sample and the second replacement sample respectively used by the first detecting and suppressing device and the second detecting and suppressing device should be the same (both are DA1).

When the OR gate 409 outputs "0", the selector 470 selects the output of the delay set 410 as its output; otherwise, when the OR gate 409 outputs "1", the selector 470 selects the replacement sample DA1 as its output to suppress impulse noise. Wherein, when one of the control signals CT1 and CT2 received by the OR gate 409 is "1", the OR gate 409 outputs "1".

Here, the control signal CT1 being "1" means that the energy sum of the samples x[k−1] and x[k] is greater than the threshold TH1 and the energy sum of the samples x[k] and x[k+1] is greater than the threshold TH2, and this can be deduced by assuming that the input of the delay set 410 is the sample x[k+3] and the output thereof is the sample x[k]. When the input of the delay set 410 is the sample x[k+3] and the output thereof is the sample x[k], the adder 404a outputs the energy sum of the samples x[k−1] and x[k] and compares it with the threshold TH1 through the comparator 405a, and the adder 404b outputs the energy sum of the samples x[k] and x[k+1] and compares it with the threshold TH2 through the comparator 405b. When the energy sum of the samples x[k−1] and x[k] is greater than the threshold TH1 and the energy sum of the samples x[k] and x[k+1] is greater than the threshold TH2, the control signal CT1 output by the AND gate 407 is "1", so that the OR gate 409 outputs "1" to control the selector 470 to select the replacement sample DA1.

In addition, the control signal CT2 being "1" requires both control signals CT1' and CT3 to be "1". Wherein, the control signal CT1' being "1" means that the sample x[k] ever be replaced by the replacement sample DA1, and the control signal CT3 being "1" means that the energy of at least one of the samples x[k+1]~x[k+4] is greater than the threshold TH3, which can be deduced by assuming that the input of the delay set 410 is sample x[k+4] and the output thereof is sample x[k+1].

When the input of the delay set 410 is the sample x[k+4] and the output thereof is the sample x[k+1], the comparator 405a compares the energy sum of the samples x[k] and x[k+1] with the threshold TH1, and the comparator 405b compares the energy sum of the samples x[k+1] and x[k+2] with the threshold TH2. When the energy sum of the samples x[k] and x[k+1] is greater than the threshold TH1 and the energy sum of the samples x[k+1] and x[k+2] is greater than the threshold TH2, the output of the AND gate 407 is "1". Here, the output of the AND gate 407 is delayed a sampling period by the delay 408 to become the control signal CT1', which means the energy sum of the samples x[k−1] and x[k] is greater than the threshold TH1 and the energy sum of the samples x[k] and x[k+] is greater than the threshold TH2, i.e. the sample x[k] will be replaced by the replacement sample DA1. Moreover, the comparator set 430 and the OR gate 450 are used for determining whether the energy of at least one of the samples x[k+1]~x[k+4] is greater than the threshold TH3, if the energy of at least one of the samples x[k+1]~x[k+4] is greater than the threshold TH3, then the control signal CT3 output by the OR gate 450 is "1".

Referring to FIG. 5, the precondition of implementing the device 500 for suppressing impulse noise is that the first and the second replacement samples respectively used by the first phase and the second phase detecting and suppressing devices have to be the same (both are DA1), and the first and the second thresholds have to be the same (both are TH1). According to the analysis of the device 400 for suppressing impulse noise as shown in FIG. 4, the outputs of the delay set 510 are respectively assumed to be the samples x[k] and x[k+1], so that those skilled in the art should be able to analyze the device 500 for suppressing impulse noise, so will not be described again here.

In summary, in the present invention, the energy sums of a plurality of samples are compared with the thresholds to determine whether the samples are interrupted by impulse noise and to suppress the samples interrupted by impulse noises, and the structure thereof is easy to be implemented. In addition, besides one phase of detection and suppression, the method and device of the present invention can also employ two phases of detection and suppression to obtain lower bit error rate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method used in a receiver of a broadcasting system when suppresses impulse noise, wherein a sample stream x[n] is received, detecting and suppressing interruption of impulse noise to the sample stream x[n] are performed, wherein the sample stream x[n] includes a plurality of samples and n represents a discrete-time independent variable, the method comprising:

comparing by using a first comparator energy sum of a $(k-1)^{th}$ sample and a $k^{th}$ sample multiplied by a first constant with a first threshold, wherein k is a positive integer;

comparing by using a second comparator energy sum of the $k^{th}$ sample and a $(k+1)^{th}$ sample multiplied by a second constant with a second threshold while the energy sum of the $(k-1)^{th}$ sample and the $k^{th}$ sample multiplied by the first constant being greater than the first threshold; and replacing the $k^{th}$ sample with a first replacement sample while the energy sum of the $k^{th}$ sample and the $(k+1)^{th}$ sample multiplied by the second constant being greater than the second threshold.

2. The method as claimed in claim 1, further comprising: outputting the $k^{th}$ sample while the energy sum of the $(k-1)^{th}$ sample and the $k^{th}$ sample multiplied by the first constant being smaller than the first threshold.

3. The method as claimed in claim 1, further comprising: outputting the $k^{th}$ sample while the energy sum of the $(k-1)^{th}$ sample and the $k^{th}$ sample multiplied by the first constant being greater than the first threshold, and the energy sum of the $k^{th}$ sample and the $(k+1)^{th}$ sample multiplied by the second constant being smaller than the second threshold.

4. The method as claimed in claim 1, further comprising: respectively comparing energies of the $(k+1)^{th}$ to a $(k+m)^{th}$ samples with a third threshold while both the energy sum of the $(k-1)^{th}$ sample and the $k^{th}$ sample multiplied by the first constant being greater than the first threshold, and the energy sum of the $k^{th}$ sample and the $(k+1)^{th}$ sample multiplied by the second constant being greater than the second threshold, wherein m is a positive integer greater than 1; and replacing the $(k+1)^{th}$ sample with a second replacement sample to output while at least one of the energies of the $(k+1)^{th}$ to the $(k+m)^{th}$ samples being greater than the third threshold.

5. The method as claimed in claim 4, further comprising: outputting the $(k+1)^{th}$ sample while the energies of the $(k+1)^{th}$ to the $(k+m)^{th}$ samples all being smaller than the third threshold.

6. The method as claimed in claim 1, wherein the first replacement sample is a data of digital value.

7. The method as claimed in claim 4, wherein the second replacement sample is a data of digital value.

8. The method as claimed in claim 1, wherein the first threshold and the second threshold are the same.

9. A device for suppressing impulse noise, used for receiving a sample stream x[n], detecting and suppressing interruption of impulse noise to the sample stream x[n], wherein the sample stream x[n] includes a plurality of samples obtained by signal sampling according to a sampling period and n represents a discrete-time independent variable, the device comprising:

a first delay, receiving the samples of the sample stream x[n] in sequence, and outputting each of the samples after delaying the sampling period;

a first energy obtainer, receiving the samples of the sample stream x[n] in sequence, and outputting energy of each of the samples;

a second delay, receiving an output of the first energy obtainer, and outputting the output of the first energy obtainer after delaying the sampling period;

an adder, receiving the output of the first energy obtainer and an output of the second delay to output energy sum of the output of the first energy obtainer and the output of the second delay;

a comparator, comparing the energy sum of the outputs of the first energy obtainer and the second delay with a first threshold or a second threshold, and outputting a first comparison result;

a third delay, receiving the first comparison result, and delaying the first comparison result for the sampling period to output a second comparison result;

a first AND gate, receiving the first comparison result and the second comparison result, and performing logic AND operation to output a first control signal; and a first selector, selecting one of an output of the first delay and a first replacement sample according to the first control signal to output as a first output signal.

10. The device as claimed in claim 9, further comprising: a first delay set, receiving a sample stream x[n-1], the sample stream x[n-1] being a delayed version of the sample stream x[n] shifted by the sampling period, and outputting the samples of the sample stream x[n-1] after delaying m-1 sampling periods;

a second energy obtainer, receiving the samples of the sample stream x[n-1], and outputting energies of the samples of the sample stream x[n-1];

a second delay set, receiving the output of the second energy obtainer, and delaying the output of the second energy obtainer to output energies of m−1 delayed samples, wherein the energy of the 1st delayed sample is the output of the second energy obtainer after delaying the sampling period, the energy of the $i^{th}$ delayed sample is the energy of the $(i-1)^{th}$ delayed sample after delaying the sampling period, wherein i is an integer and 1<i<=m;

a comparator set, receiving the output of the second energy obtainer, the energies of the delayed samples and a third threshold, and comparing the output of the second energy obtainer and the energy of each of the delayed samples with the third threshold to output a comparison result;

an OR gate, receiving the comparison results, and performing logic OR operation to output a third control signal;

a second AND gate, receiving the first and the third control signals, and performing logic AND operation to output a second control signal; and a second selector, selecting one of the output of the first delay set and a second replacement sample according to the second control signal to output as a second output signal.

11. The device as claimed in claim 9, wherein the first replacement sample is a data of digital value.

12. The device as claimed in claim 10, wherein the second replacement sample is a data of digital value.

13. The device as claimed in claim 9, wherein the first and the second thresholds are the same.

14. A device for suppressing impulse noise, used for receiving a sample stream x[n], detecting and suppressing interruption of the impulse noise to the sample stream x[n], wherein the sample stream x[n] includes a plurality of samples, wherein n represents a discrete-time independent variable, the device comprising:

a first comparator, comparing energy sum of a $(k-1)^{th}$ sample and a $k^{th}$ sample multiplied by a first constant with a first threshold, and outputting a first comparison result, wherein k is a positive integer;

a second comparator, comparing energy sum of the $k^{th}$ sample and a $(k+1)^{th}$ sample multiplied by a second constant with a second threshold, and outputting a second comparison result; and a first selector, determining whether to replace the $k^{th}$ sample with a first replacement sample to output according to the first comparison result and the second comparison result.

15. The device as claimed in claim 14, wherein the first selector determines to replace the $k^{th}$ sample with the first replacement sample to output while the first comparison result indicates that the energy sum of the $(k-1)^{th}$ sample and the $k^{th}$ sample multiplied by the first constant is greater than the first threshold, and the second comparison result indicates that the energy sum of the $k^{th}$ sample and the $(k+1)^{th}$ sample multiplied by the second constant is greater than the second threshold.

16. The device as claimed in claim 14, wherein the first selector determines to output the $k^{th}$ sample while the first comparison result indicates that the energy sum of the $(k-1)^{th}$ sample and the $k^{th}$ sample multiplied by the first constant is smaller than the first threshold.

17. The device as claimed in claim 14, wherein the first selector determines to output the $k^{th}$ sample while the first comparison result indicates that the energy sum of the $(k-1)^{th}$ sample and the $k^{th}$ sample multiplied by the first constant is greater than the first threshold, and the second comparison result indicates that the energy sum of the $k^{th}$ sample and the $(k+1)^{th}$ sample multiplied by the second constant is smaller than the second threshold.

18. The device as claimed in claim 14, further comprising:

a comparator set, respectively comparing energies of the $(k+1)^{th}$ to a $(k+m)^{th}$ samples with a third threshold, and outputting a third comparison result while the first comparison result indicates that the energy sum of the $(k-1)^{th}$ sample and the $k^{th}$ sample multiplied by the first constant is greater than the first threshold, and the second comparison result indicates that the energy sum of the $k^{th}$ sample and the $(k+1)^{th}$ sample multiplied by the second constant is greater than the second threshold, wherein m is a positive integer greater than 1; and a second selector, determining whether to replace the $(k+1)^{th}$ sample with a second replacement sample to output according to the third comparison result.

19. The device as claimed in claim 18, wherein the second selector determines to replace the $(k+1)^{th}$ sample with the second replacement sample to output while the third comparison result indicates that at least one of the energies of the $(k+1)^{th}$ to the $(k+m)^{th}$ samples is greater than the third threshold.

20. The device as claimed in claim 18, wherein the second selector determines to output the $(k+1)^{th}$ sample while the third comparison result indicates that all the energies the $(k+1)^{th}$ to the $(k+m)^{th}$ samples are smaller than the third threshold.

21. The device as claimed in claim 14, wherein the first replacement sample is a data of digital value.

22. The device as claimed in claim 18, wherein the second replacement sample is a data of digital value.

23. The device as claimed in claim 14, wherein the first and the second thresholds are the same.

* * * * *